Aug. 6, 1957
J. A. DAVIDIAK ET AL
2,801,472
VERNIER GAUGE
Filed March 24, 1954
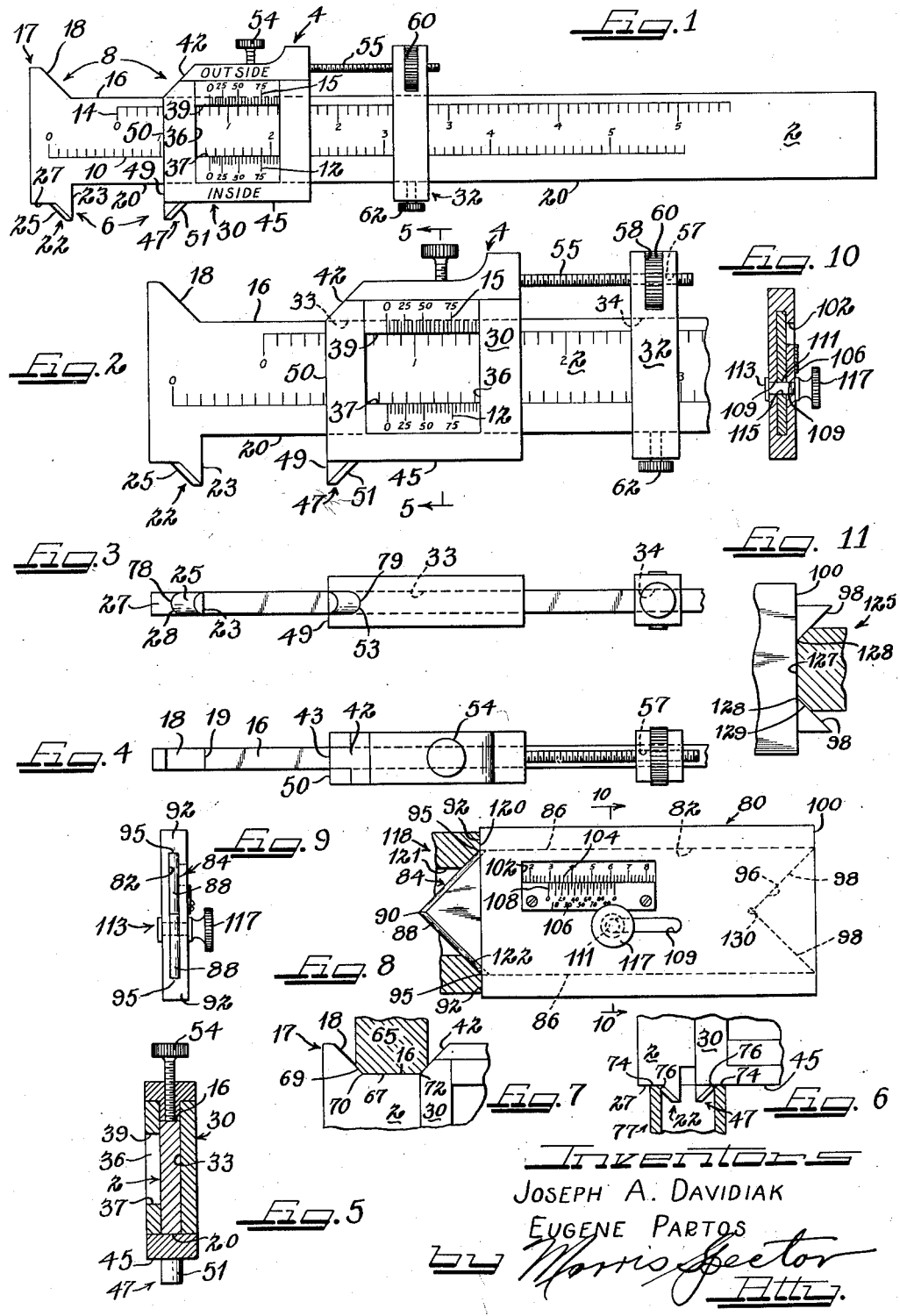
Inventors
JOSEPH A. DAVIDIAK
EUGENE PARTOS
by Morris Spector
Atty.

United States Patent Office 2,801,472
Patented Aug. 6, 1957

2,801,472
VERNIER GAUGE
Joseph A. Davidiak and Eugene Partos, Chicago, Ill.
Application March 24, 1954, Serial No. 418,346
1 Claim. (Cl. 33—143)

This invention relates to measuring devices and more particularly to vernier gauges or calipers.

Vernier calipers usually include a pair of relatively movable measuring jaws which present parallel inner and outer jaw surfaces for engaging and measuring the outer and inner diameters of cylindrical surfaces. A vernier scale is provided to accurately indicate the spacing between the outer and inner jaw surfaces. These vernier calipers, however, are unable to measure all of the inner and outer diameters of chamfered cylindrical objects. A cylindrical object when has been externally chamfered provides a circular edge located inwardly of the periphery of the object. This edge is defined by the points of intersection between the chamfered surface and the adjacent flat end face of the object. A conventional vernier caliper is unable to measure the diameter of this inner circular edge. In the specification to follow, the diameter of this circular edge will be referred to as the smaller outer diameter of an externally chamfered object. Where a cylindrical object has a central cylindrical hole which includes a chamfered surface at the entryway thereto, a circular edge is provided at the intersection between the chamfered surface and the adjacent flat end face of the object, which edge has a diameter larger than the minimum diameter of the central hole. A conventional calipers is unable to measure the dimension of the latter edge. The diameter of the last-mentioned circular edge will be referred to in the specification as the larger inner diameter of an internally chamfered object.

A primary object of the invention, therefore, is to provide a vernier calipers measuring device which can accurately measure the smaller diameter of an externally chamfered circular object and the larger inner diameter of an internally chamfered circular object. Another object of the invention is to provide a vernier calipers or measuring device of the above type wherein the device is easy to operate and is of such simple construction that it may be economically manufactured.

In one form of the invention, two separate pairs of measuring jaws are provided, one pair being adapted to measure the larger inner diameter of an internally chamfered object and the other pair of jaws being adapted to measure the smaller inner diameters of an externally chamfered object. Each pair of jaws define two obtusely angled intersecting surfaces. One of these surfaces is adapted to engage the flat outer face of the object to be measured and the other intersecting surface is adapted to extend along the chamfered surface of the object. The jaws are moved into positions where the points of intersection of the obtusely angled surfaces thereof engage the point of intersection between the outer flat face of the body and the chamfered surface. The dimension of the body is measured by means of a vernier scale which indicates the spacing between the intersecting surfaces of the jaws. To move the jaws into these measuring positions, the angle between the obtusely angled surfaces of the jaws must be at least equal to or larger than the angle between the flat outer face of the body and the chamfered surface thereon.

In another form of the invention one of the movable parts of the measuring device comprises a part having a tapered end with outwardly converging edges which are adapted to extend into a hole having a chamfered entryway in the object to be measured. The opposite end of this part has a tapered slot which provides inwardly converging surfaces which are adapted to straddle an external chamfered surface of an object to be measured. The second part of the calipers constitutes a housing which slidably receives the tapered part and has opposite parallel edges which are adapted to abut the outer flat face of the body to be measured. The tapered ends of the first part may be projected in varying amounts beyond the aforementioned parallel edges of the other part. In using the device, one of the latter edges is placed in abutment with the outer flat face of the object to be measured adjacent to the chamfered surface thereof and the tapered part is projected beyond the latter edge until the point of intersection of the tapered edges of the part and said edge coincide with the intersection of the chamfered surface and the outer flat face of the object. A vernier scale is provided which indicates the spacing between the points of intersection of the tapered edges of the one part with the adjacent edge of the other part so as to measure the internal or external diameter of the chamfered object.

Other objects, advantages and features of the invention will become apparent upon making reference to the specification to follow and the drawings which illustrate two embodiments of the invention.

In the drawings:

Fig. 1 is an elevational view of one form of the invention;

Fig. 2 is an enlarged fragmentary elevational view of a part of the measuring device of Fig. 1;

Fig. 3 is a bottom view of a portion of the device shown in Fig. 2;

Fig. 4 is a top view of a portion of the device shown in Fig. 2;

Fig. 5 is a transverse section of the slide member taken along section line 5—5 in Fig. 2;

Fig. 6 is a fragmentary view of the measuring device of Fig. 1 showing the measuring jaws thereof in position to measure the larger inner diameter of an internally chamfered object;

Fig. 7 is a fragmentary view of a portion of the measuring device of Fig. 1 showing the jaws of the device in position to measure the smaller outer diameter of an externally chamfered object;

Fig. 8 is an elevational view of a modified form of the invention showing the device in position to measure the larger inner diameter of an internally chamfered object;

Fig. 9 is an end view of the device of Fig. 8;

Fig. 10 is a sectional view taken along section 10—10 in Fig. 8; and

Fig. 11 is a fragmentary view of the device of Fig. 8 showing the device in position to measure the larger outer diameter of an externally chamfered object.

Reference should now be made to the drawings where similar reference characters indicate similar elements throughout.

The vernier calipers shown in Figs. 1 through 7 includes two relatively movable parts comprising an elongated, rectangular frame member 2 and a slide assembly 4 which is slidable longitudinally along the frame member 2, as is conventional in vernier calipers. A pair of relatively movable measuring jaws 6 is provided on the frame member and the slide assembly for measuring the larger inner diameter of an internally chamfered cylindrical object, and a pair of relatively movable jaws 8 is provided on the frame member and the slide assembly for measuring the smaller outer diameter of an externally chamfered object.

The frame member 2 has a longitudinally extending, linearly graduated scale 10 opposite the jaws 6 which in cooperation with a bottom vernier scale 12 on the slide assembly 4 measures the spacing between respective points on the pair of jaw members 6. An upper longitudinally extending, linearly graduated scale 14 on the frame member 2 cooperates with an upper vernier scale 15 on the slide assembly for measuring the distance between two points on the upper pair of measuring jaws 8.

The elongated frame member 2 has an upper longitudinal edge including a straight edge portion 16 which extends parallel to the length of the frame member and a jaw extension 17 having the inclined edge portion 18 which makes an obtuse angle with the edge portion 16. The inclined edge portion 18 constitutes one of the jaws of the upper pair of jaws 8 of the calipers. The bottom longitudinal edge of the frame member 2 includes a straight edge portion 20 which is parallel to the top edge portion 16 and a jaw extension 22 having innermost edge portion 23 which extends at right angles to the longitudinal edge portion 20. The outer face of the jaw extension 22 has an inclined, partially cylindrical edge surface 25 which intersects the straight edge portion 27 along a curved line of intersection 28. The flat edge portion 27 is parallel to the longitudinal edge portion 20 of the frame member. The jaw extension 22 comprises one of the pair of measuring jaws 6 of the calipers.

The slide assembly 4 includes vernier head 30 and an adjusting head 32 which have respective rectangular guideways 33 and 34 which telescopically receive the frame member 2. The slide assembly 4 is thus slidable along the frame member 2 in a direction parallel to the longitudinal edge portions 16 and 20 thereof. The vernier head 30 has a rectangular window 36 which exposes the vernier scales 10 and 14 of the frame member 2. The vernier scales 12 and 15 extend along the opposite longitudinal edges 37 and 39 of the window 36 so as to be adjacent the scales 10 and 14, respectively. The front top edge of the vernier head 30 presents a flat, inclined surface 42 which intersects with the flat edge portion 16 of the frame member along a straight line of intersection 43. The inclined face 42 forms an obtuse angle with the longitudinal edge portion 16 of the frame member.

The bottom of the vernier head presents a flat surface 45 which is coplanar with the flat edge portion 27 of the jaw extension 22 of the frame member. Extending from the front of this flat surface 45 is a jaw extension 47 which constitutes a second jaw of the pair of jaws 6. The jaw extension 47 has a forward or innermost flat edge 49 which is flush with the vertical front edge 50 of the vernier head and which is therefore parallel to a vertical innermost face 23 of the jaw extension 22 of the frame member. The outer face of the jaw extension 47 presents an inclined partially cylindrical edge surface 51 which is similar to but inclined in the opposite direction to the curved inclined surface 25 of the jaw extension 22. The surface 51 makes an obtuse angle with respect to the flat bottom portion 45 of the vernier head and intersects therewith in a curved line of intersection 53.

A clamping nut 54 is threaded into the top side of the vernier head 30 and may be tightened to bear against the top longitudinal edge portion 16 of the frame member to fixedly lock the vernier head in place on the frame member.

A longitudinally extending adjusting screw 55 extends between the vernier head 30 and the adjusting head 32. The screw is threaded into the vernier head at one end and extends freely through a hole 57 in the adjusting head. The adjusting head 32 is slotted as at 58 to receive an internally threaded adjusting screw 60 which is threaded over the adjusting screw 55. A clamping screw 62 is threaded into the bottom of the adjusting head 32 and may be tightened so as to bear against the bottom longitudinal edge portion 20 of the frame member so as to lock the adjusting head on the frame member.

The vernier calipers illustrated in Figs. 1 through 7 is used in the following manner: In measuring the smaller outer diameter of an externally chamfered object 65 (Fig. 7) the upper longitudinal edge portion 16 of the frame member which is between the jaws 8 is placed against the flat outer face 67 of the body which is adjacent to the chamfered surface 69. The upper jaw extension 17 is moved into position so that the line of intersection 19 between the inclined jaw surface 18 and the longitudinal edge portion 16 of the frame member coincides with the intersection 70 between the chamfered surface 69 and the flat outer face 67 of the object 65 being measured. The clamping screws 54 and 62 of the slide assembly are loosened to permit the slide assembly to freely slide along the frame member 2. When the vernier head is adjacent to the object 65, the clamping screw 62 of the adjusting head is tightened to lock the adjusting head to the frame 2. Then the adjusting nut 60 is rotated to move the vernier head into intimate contact with the object 65. The inclined upper front face 42 of the vernier head 30 is moved into position where the line of intersection 43 between the top longitudinal edge portion 16 of the frame member and the inclined slide surface 42 coincides with the point of intersection 72 between the external chamfer 69 and the outer flat face 67 of the object to be measured. This point is reached when the vernier head 30 can no longer be moved toward the jaw extension 17. In order to move the caliper jaws 8 into this position, the obtuse angles between the inclined surfaces 18 and 42 of the longitudinal edge portion 16 of the frame member must be equal to or greater than the obtuse angle between the chamfered surface of the object 65 and the outer flat surface 67 thereof. The distance between the intersecting points 70 and 72 of the object 65 can be read on the scales 14 and 15.

The clamping screw 54 is utilized to initially fix the position of the vernier head 30 to provide a given predetermined spacing between the caliper jaws where the calipers is used as a checking instrument to determine whether the parts to be measured meet a given set of specifications.

In using the calipers to indicate the larger internal diameter of an internally chamfered object (Fig. 6), the clamping screws are loosened and the coplanar flat surfaces 45 and 27 of the slide and frame member, respectively, are placed on an outer flat face 74 of an object 77 to be measured, with the jaw extensions 22 and 47 extending into the inner portion of the object to be measured opposite the chamfered surface 76 thereof. The clamping screw 62 of the adjusting head 32 is tightened to lock the adjusting head to the frame member, and then the adjusting nut 60 is rotated and the jaw extensions 22 and 47 move outwardly with respect to each other for the maximum distance permitted by the internal dimensions of the member 76. The curved jaw surfaces 25 and 51 then make a line or point contact with diametrically opposed points on the chamfered surface 76 if the curvature of the surfaces 25 and 51 is equal to or greater than the curvature of the chamfered surface 76. The obtuse angle between the jaw surfaces 25 and 51 and the adjacent flat jaw surfaces 27 and 45 are made equal to or larger than the obtuse angle between the chamfered surface 76 and the outer flat face 74 of the object 77 so that the outermost points 78 and 79 of the curved intersecting lines 28 and 53 between the curved jaw surfaces 25—27 and 51—45 can be precisely located at the points of intersection of the chamfered surface 76 and the outer flat face 74 of the object 77. The spacings between these points of intersection are indicated by the linear graduated scale 10 and the vernier scale 12. The smallest dimension which can be measured by the measuring jaws 6 is the space between the points 78 and 79 thereon when the vertical facing jaw surfaces 23 and 49 are in abutment.

Reference should now be made to Figs. 8 through 10 which illustrates another embodiment of the invention. In this embodiment, an outer part 80 has a rectangular guide channel 82 extending longitudinally therethrough which slidably receives an inner part 84. The front end of the part 84 has a pair of outwardly converging rounded edges 88 which join at a point 90 to form a pointed front end. The edges 88 intersect with the longitudinal edges 86 of the inner part and are symmetrical about a line extending in the direction of movement of the inner part 84. The outer part 80 has a vertical front flat face 92 which extends at right angles to the direction of relative movement of the inner and outer parts of the device. The top and bottom ends of the inclined surfaces 88 intersect with the front vertical face 92 of the outer part at points 95 and the spacing between the points 95 may be varied by varying the distance which the inclined end of the inner part projects beyond the vertical face 92.

The opposite end of the inner part 84 has a generally triangular slot 96 providing inwardly converging edges 98 which intersect with the longitudinal edges 86 of the inner part and are parallel with the corresponding front inclined edges 88. The adjacent end of the outer part 80 has a vertical flat face 100 which extends at right angles to the direction of movement of the inner part 84. The inner part 84 may be slid within the outer part 80 so that the slotted end projects beyond the face 100 (see Fig. 11).

One side of the outer part 80 is cut away to provide a rectangular slot 102 which exposes the longitudinally extending linear scale 104 which is placed on the inner part 84. A rectangular plate 106 having a vernier scale 108 is secured to the outer part adjacent to the edges of the window 102 so that the vernier scale 108 and the linear scale 104 are adjacent one another.

Means is provided for locking the inner part 84 in any one of its adjusted positions. To this end, longitudinally extending slots 109 are formed in the sides of the outer part 80 which receives a threaded shank 111 of a headed screw 113. The screw shank 111 passes through a circular hole 115 in the inner part 84. A knurled nut 117 is threaded over the shank of the screw 113 at one side of the outer part 80. By loosening the knurled nut 117 slightly, the inner part 84 may be moved into a position permitted by the extreme ends of the slots 109. By tightening the knurled nut 117, the inner part 84 may be fixed in position with respect to the outer part 80.

The measuring device of Figs. 8 through 11 is operated as follows: In measuring the larger internal diameter of an internally chamfered body 118 (Fig. 8), the locking nut 117 is loosened and the tapered front end of the inner part is telescoped in the outer part 80. Then the flat face 92 of the outer part 80 is placed in abutment with the flat outer face 120 of the object 118, and the inner part is moved into the bore 121 of the object, with the outwardly converging edges 88 extending into the bore. When the inner part has been moved into the bore 121 as far as possible, the locking nut is tightened and the inner diameter of the object is read on the scales 108 and 104. Note that there is a linear relationship between the amount of the inner part which projects beyond the outer part and the spacing between the points of intersection of the tapered edges 88 and the flat face 92 of the outer part. As before, the angle between the inclined edges 88 and the flat face 92 must be equal to or greater than the angle between the chamfered surface 122 and the outer flat face 120 of the object 118, so that the points 95 at the intersection between the inclined edges 88 and the flat face 92 will engage the intersecting points between the chamfered surface and the outer face of the body. Also, the curvature of the inclined surfaces 88 must be equal to or greater than the curvature of the chamfered surface 122 so that the inclined edges 88 may engage an object diametrically opposite the points thereon.

The smaller outer diameter of an externally chamfered object 125 (Fig. 11) may be measured by placing the flat end face 100 of the outer part 80 against the flat outer face 127 of the object 125. The knurled nut 117 is loosened slightly and the inner part 84 is moved to the right as viewed in Fig. 8, until the part can be moved no further. As before, the angle between the edges 98 and the face 100 of the outer part 80 must be equal to or greater than the angle between the chamfered surface 129 on the object 125 and the outer flat face 127 thereof. Then, the intersection 128 between the profile of the inclined edges 98 and the flat outer face 100 will coincide with the intersection of the chamfered surface 129 and the outer flat face 127 of the object 125. The spacing between these points is then accurately measured by reading the scales 104 and 108.

The profiles of the inclined front edges 88 and the rear inclined edges 98 are similar so that the tip 90 of the converging edges 88 and the tip 130 of the converging edges 98 will be in line with the front and rear outer faces 92 and 100 of the outer part when the zero points on the scales 104 and 108 coincide. This permits the use of only one pair of scales to measure inner and outer diameters of chamfered objects.

It should be understood that numerous modifications may be made of the specific forms of the invention above described without deviating from the broader aspects of the invention.

We claim:

A device for measuring the distance between the edges of a chamfered object comprising an outer frame part having a relatively narrow guide channel formed therein which opens onto opposite ends thereof, the outer end surfaces of said frame part contiguous to the guide slot openings being flat surfaces extending at right angles to the length of the guide slot, a relatively thin, flat inner part slidable within said guide slot of said outer frame part, said inner part having a pair of oppositely inclined edges converging toward one end of said inner part and adapted to project beyond one end of said outer frame part to extend within an internally chamfered object resting against said flat outer surface at the latter end of the outer frame part, the other end of said inner part having a pair of oppositely inclined edges converging toward said one end thereof and adapted to project beyond the other end of said outer frame part and to straddle an externally chamfered surface of an object placed against the outer flat surface at said other end of said outer frame part, and means for measuring the distances between the points of intersection of said pairs of oppositely inclined edges and the planes of said flat end surfaces of said outer frame part.

References Cited in the file of this patent
UNITED STATES PATENTS

| | | |
|---|---|---|
| 490,860 | Snoeck | Jan. 11, 1893 |
| 741,146 | Labofish | Oct. 13, 1903 |
| 878,439 | Wagniere | Feb. 4, 1908 |
| 1,002,149 | Hauser | Aug. 29, 1911 |
| 1,194,749 | Kirk | Aug. 15, 1916 |
| 1,396,117 | Iliff | Nov. 8, 1921 |
| 2,462,545 | Penjaska | Feb. 22, 1949 |
| 2,529,931 | Gallup | Nov. 14, 1950 |
| 2,560,176 | Kessler | July 10, 1951 |
| 2,758,383 | Breit | Aug. 14, 1956 |